(12) United States Patent
Kang et al.

(10) Patent No.: US 8,860,252 B2
(45) Date of Patent: Oct. 14, 2014

(54) POWER STORAGE SYSTEM, METHOD OF CONTROLLING THE SAME, AND COMPUTER READABLE RECORDING MEDIUM STORING A PROGRAM FOR EXECUTING THE METHOD

(75) Inventors: Jin-Wook Kang, Yongin-si (KR); Jae-Soon Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 504 days.

(21) Appl. No.: 13/042,102

(22) Filed: Mar. 7, 2011

(65) Prior Publication Data

US 2012/0043819 A1 Feb. 23, 2012

(30) Foreign Application Priority Data

Aug. 20, 2010 (KR) ........................ 10-2010-0080885

(51) Int. Cl.
*H02J 3/30* (2006.01)
*H02J 1/00* (2006.01)
*H02J 3/32* (2006.01)
*H02J 3/34* (2006.01)

(52) U.S. Cl.
CPC ...................................... *H02J 3/32* (2013.01)
USPC ................................................ 307/80; 307/46

(58) Field of Classification Search
USPC ............................. 307/43, 45, 46, 64–66, 80
See application file for complete search history.

(56) References Cited

U.S. PATENT DOCUMENTS

| | | | | |
|---|---|---|---|---|
| 2004/0095021 A1* | 5/2004 | Fogleman et al. | ............... | 307/52 |
| 2004/0207366 A1* | 10/2004 | Sung | ............................ | 320/140 |
| 2005/0184594 A1* | 8/2005 | Fredette | .......................... | 307/78 |
| 2006/0197382 A1 | 9/2006 | Chou et al. | | |
| 2008/0278115 A1* | 11/2008 | Huggins | ....................... | 320/134 |
| 2009/0236916 A1* | 9/2009 | Nishimura | ...................... | 307/80 |
| 2011/0095606 A1* | 4/2011 | Ou | ................................... | 307/26 |
| 2011/0115295 A1* | 5/2011 | Moon et al. | ...................... | 307/65 |

FOREIGN PATENT DOCUMENTS

| | | |
|---|---|---|
| JP | 2004-180467 A | 6/2004 |
| JP | 2008-54473 A | 3/2008 |
| KR | 10-2003-0006270 A | 1/2003 |
| KR | 10-2006-0087837 A | 8/2006 |
| KR | 10-2006-0096353 A | 9/2006 |
| KR | 10-2008-0034569 A | 4/2008 |

OTHER PUBLICATIONS

English machine translation of applicant cited application 10-2005-0008690.*
Applicant cited Kim (10-2005-0008690).*
Korean Office Action dated Aug. 25, 2011 issued in Korean Application No. 10-2010-0080885, 4 pages.
Machine English Translation of JP2004-180467A, 46 pages.

* cited by examiner

*Primary Examiner* — Rexford Barnie
*Assistant Examiner* — Rasem Mourad
(74) *Attorney, Agent, or Firm* — Christie, Parker & Hale, LLP (57) ABSTRACT

A power storage system for supplying power to a load by coupling a power generation system, a battery, and a grid, the power storage system includes a battery management system (BMS) for controlling charging and discharging of the battery and a power supply circuit for supplying power to the BMS, wherein the power supply circuit is configured to supply external power to the BMS as an operating power of the BMS in a first state in which the external power is applied, and the power supply circuit is configured to supply power of the battery to the BMS as the operating power of the BMS in a second state in which the external power is not applied.

14 Claims, 7 Drawing Sheets

POWER STORAGE SYSTEM, METHOD OF CONTROLLING THE SAME, AND COMPUTER READABLE RECORDING MEDIUM STORING A PROGRAM FOR EXECUTING THE METHOD

CROSS-REFERENCE TO RELATED APPLICATION

This application claims priority to and the benefit of Korean Patent Application No. 10-2010-0080885, filed on Aug. 20, 2010, in the Korean Intellectual Property Office, the content of which is incorporated herein in its entirety by reference.

BACKGROUND

1. Field

Aspects of embodiments according to the present invention relate to a power storage system, a method of controlling the same, and a computer readable recording medium storing a program for executing the method.

2. Description of the Related Art

Interest in systems for storing power and efficiently using the stored power has increased to address problems such as environmental pollution and resource exhaustion. There is also increased interest in renewable energy that does not cause pollution during power generation. Thus, research into power storage systems, which may be used with renewable energy, a power storage battery, and existing grid power, has been actively conducted as changes occur in domestic and overseas environments.

A battery included in a power storage system is controlled by a battery management system (BMS) that is supplied with external power as an operational power.

SUMMARY

One or more embodiments of the present invention are directed toward a power storage system including a battery management system (BMS) capable of stably operating when a supply of external power is stopped, a method of controlling the power storage system, and a computer readable recording medium storing a program for executing the method.

Additional aspects will be set forth in part in the description which follows and, in part, will be apparent from the description, or may be learned by practice of the presented embodiments.

According to one or more embodiments of the present invention, a power storage system is configured to supply power to a load by coupling a power generation system, a battery, and a grid. The power storage system includes: a battery management system (BMS) for controlling charging and discharging of the battery; and a power supply circuit for supplying power to the BMS, wherein the power supply circuit is configured to supply external power to the BMS as an operating power of the BMS in a first state in which the external power is applied, and the power supply circuit is configured to supply power of the battery to the BMS as the operating power of the BMS in a second state in which the external power is not applied.

The power supply circuit may include: a first power supply path for applying the external power to the BMS; and a second power supply path for applying the power of the battery to the BMS.

The power supply circuit may include: a first diode coupled between an input terminal to which the external power is applied and a power supply terminal of the BMS; a converter for reducing an output voltage of the battery; and a second diode coupled between the converter and the power supply terminal of the BMS.

The converter may be configured to reduce the output voltage of the battery to be the same magnitude as a voltage of the external power.

The converter may be configured to reduce the output voltage of the battery to an operating voltage of the BMS.

The power supply circuit may further include a power switching unit for controlling a supply of the power of the battery to the converter according to the control of the BMS.

The BMS may be configured to turn the power switching unit on in the second state.

The battery may include a plurality of battery racks.

The power supply circuit may be configured to receive power from a battery rack having a maximum remaining capacity from among the plurality of battery racks in the second state.

The power storage system may further include a plurality of diodes each coupled between a corresponding one of the plurality of battery racks and the power supply circuit.

The power supply circuit may be configured to receive power from a previously set battery rack from among the plurality of battery racks in the second state.

According to one or more embodiments of the present invention, a method of controlling a power storage system for supplying power to a load is provided. The power storage system couples power of a power generation system, a battery, and a grid, and includes a BMS for controlling charging and discharging of the battery and a power supply circuit for supplying power to the BMS. The method includes: (a) supplying external power to the BMS as an operating power of the BMS in a first state in which the external power is applied, and (b) supplying power of the battery to the BMS as the operating power of the BMS in a second state in which the external power is not applied.

In operation (b), the output voltage of the battery may be reduced to be the same magnitude as a voltage of the external power.

In operation (b), the output voltage of the battery may be reduced to an operating voltage of the BMS.

The method may further include: (c) controlling a supply of the power of the battery to the power supply circuit according to whether the external power is applied.

The battery may include a plurality of battery racks, and the method may further include: (d) receiving power from a battery rack having a maximum remaining capacity from among the plurality of battery racks in the second state.

The battery may include a plurality of battery racks, and the method may further include: (e) receiving power from a previously set battery rack among the plurality of battery racks in the second state.

According to one or more embodiments of the present invention, a computer readable recording medium having recorded thereon a program for executing the above described methods is provided.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

Reference will now be made in detail to embodiments, examples of which are illustrated in the accompanying drawings. In the drawings, the same elements are denoted by the same reference numerals, and a repeated explanation thereof will not be given.

Figure 1:
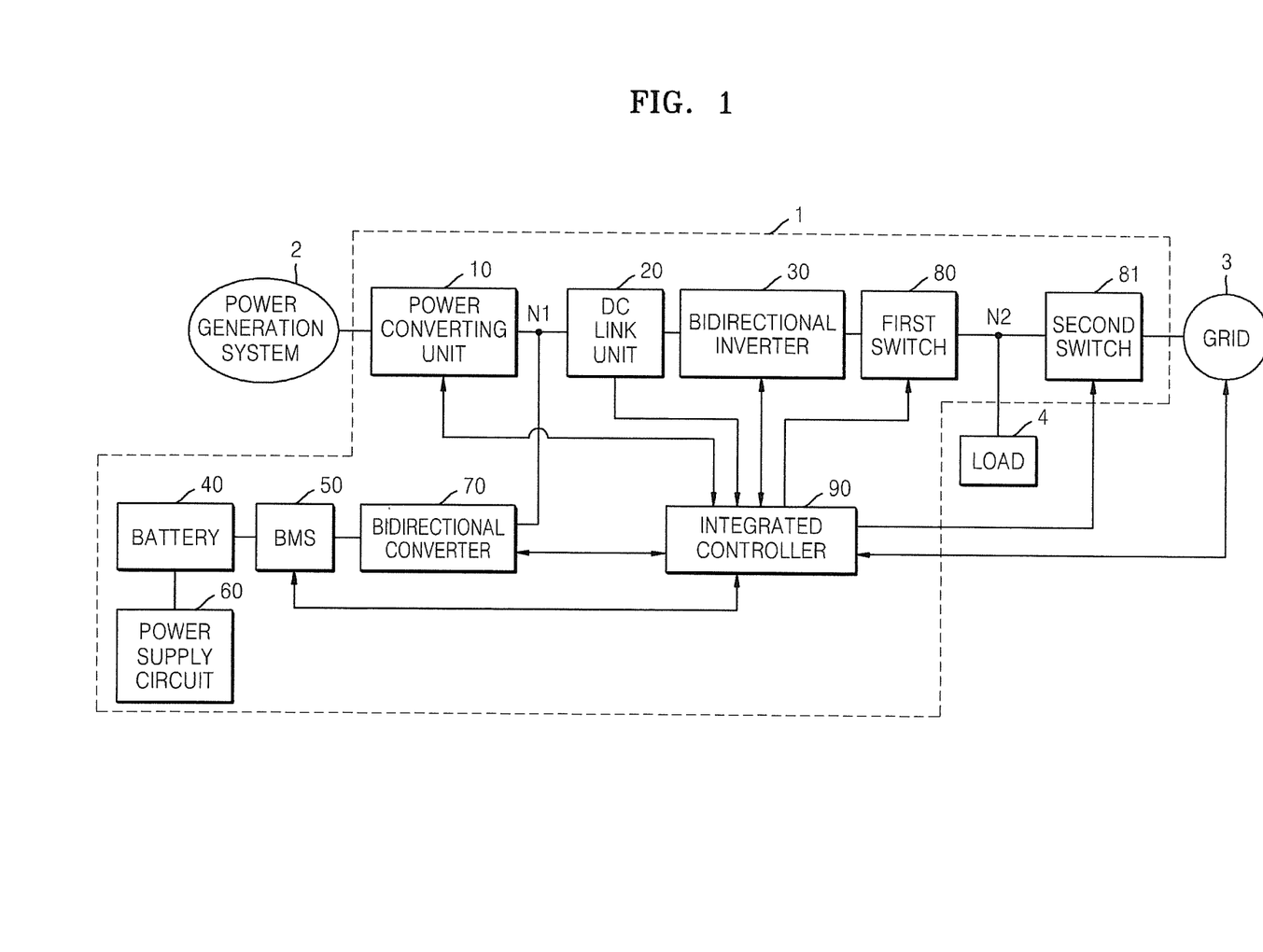
FIG. 1 is a block diagram of a power storage system according to an embodiment of the present invention.

FIG. 1 is a block diagram of a power storage system 1 according to an embodiment of the present invention.

Referring to FIG. 1, the power storage system 1 supplies power to a load 4 by being coupled to a power generation system 2 and a grid 3.

The power generation system 2 is a system that generates power by using an energy source. The power generation system 2 supplies the generated power to the power storage system 1. The power generation system 2 may be a solar power generation system, a wind power generation system, or a tidal power generation system. However, the present embodiment is not limited thereto, and the power generation system 2 may be any suitable power generation system that may generate power by using renewable energy such as solar heat or geothermal heat, or by using any other suitable energy sources. In one embodiment, solar cells for generating electrical energy by using sunlight may be applied to the power storage system 1, and the solar cells may be distributed at houses and factories because it is easy to install the solar cell thereon. The power generation system 2 may act as a high-capacity energy system by generating power by using a plurality of power generation modules that are arranged in parallel.

The grid 3 includes a power plant, a substation, power lines, and the like. When the grid 3 is in a normal state, the grid 3 supplies power to the power storage system 1 and/or the load 4, or receives power supplied from the power storage system 1. When the grid 3 is in an abnormal state, the grid 3 does not supply power to either the power storage system 1 or the load 4, and the power storage system 1 stops supplying power to the grid 3.

The load 4 consumes power generated by the power generation system 2, power stored in a battery 40, or power supplied from the grid 3. A house or a factory may be an example of the load 4.

The power storage system 1 may store power generated by the power generation system 2 in the battery 40 and send the generated power to the grid 3. The power storage system 1 may deliver power stored in the battery 40 to the grid 3 or store power supplied from the grid 3 in the battery 40. In an abnormal situation, for example, when there is a power failure in the grid 3, the power storage system 1 may supply power to the load 4 by performing as an uninterruptible power supply (UPS). Even when the grid 3 is in a normal state, the power storage system 1 may supply power generated by the power generation system 2 or power stored in the battery 40 to the load 4.

The power storage system 1 includes a power converting unit 10, a direct current (DC) link unit 20, a bidirectional inverter 30, the battery 40, a battery management system (BMS) 50, a power supply circuit 60, a bidirectional converter 70, a first switch 80, a second switch 81, and an integrated controller 90.

The power converting unit 10 is coupled between the power generation system 2 and a first node N1, and delivers power generated by the power generation system 2 to the first node N1. Here, an output voltage of power output from the power converting unit 10 is converted into a DC link voltage. That is, the power generated by the power generation system 2 may be supplied to the battery 40, the grid 3, and the load 4 by operating the power converting unit 10.

The power converting unit 10 may include a converter or a rectifier circuit according to the type of the power generation system 2. More specifically, if the power generation system 2 generates DC power, the power converting unit 10 may include a converter for converting the DC power to DC power. On the contrary, if the power generation system 2 generates alternating current (AC) power, the power converting unit 10 may include a rectifier circuit for converting the AC power to DC power. In particular, if the power generation system 2 is a solar power generation system, the power converting unit 10 may include a maximum power point tracking (MPPT) converter so as to obtain maximum power output from the power generation system 2 according to a change in solar radiation, temperature, or the like.

When the power generation system 2 generates no power, the power converting unit 10 may stop operating and reduce or minimize power consumption of a converter included in the power converting unit 10 or the like.

The DC link unit 20 is coupled between the first node N1 and the bidirectional inverter 30 and maintains the DC link voltage of the first node N1. A level of a voltage at the first node N1 may become unstable due to an instantaneous voltage drop of the power generation system 2 or the grid 3 or a peak load occurrence in the load 4. However, the voltage at the first node N1 needs to be stabilized to normally operate the bidirectional inverter 30 and the bidirectional converter 70. The DC link unit 20 may be included to stabilize a level of the DC link voltage of the first node N1, and may be realized by, for example, a suitably large capacitor (e.g., a mass storage capacitor), etc. Although the DC link unit 20 is included in the power storage system 1 separated from other parts in the embodiment shown in FIG. 1, the DC link unit 20 may be included in the power converting unit 10, the bidirectional inverter 30, or the bidirectional converter 70.

The bidirectional inverter 30 is a power converter coupled between the DC link unit 20 and the first switch 80. The bidirectional inverter 30 converts the DC link voltage Vlink output from the power generation system 2 or the battery 40 into an alternating current (AC) voltage of the grid 3 and outputs the AC voltage in a discharging mode. The bidirectional inverter 30 rectifies an AC voltage output from the grid 3 into the DC link voltage to be stored in the battery 40 in a charging mode. The bidirectional inverter 30 may include a filter for removing harmonics from the AC voltage output to the grid 3, and a phase-locked loop (PLL) circuit for matching a phase of the AC voltage output from the bidirectional inverter 30 to a phase of the AC voltage of the grid 3 in order to prevent generation of reactive power. Also, the bidirectional inverter 30 may perform other functions such as restriction of voltage variation range, power factor correction, removal of DC components, and protection from transient phenomenon. When it is unnecessary for supplying the power generated by the power generation system 2 or the power stored in the battery 40 to the grid 3 or the load 4, or when power from the grid 3 is unnecessary for charging the battery 40, the operation of the bidirectional inverter 30 may be stopped so as to minimize or reduce power consumption.

The battery 40 receives and stores power generated by the power generation system 2 or power output from the grid 3, and supplies power stored in the battery 40 to the load 4 or the grid 3.

Hereinafter, the construction of the battery 40 will be described in more detail with reference to FIGS. 2 and 3.

Figure 2:
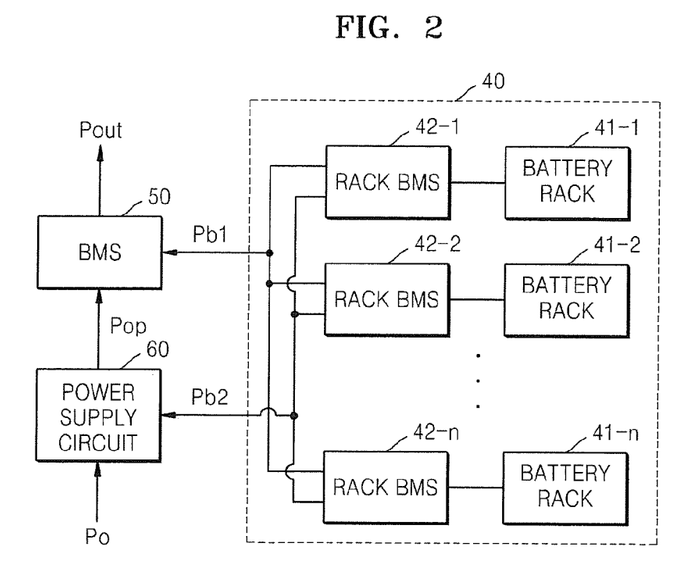
FIG. 2 is a block diagram of a battery, a battery management system (BMS), and a power supply circuit that are coupled to each other, according to an embodiment of the present invention.

FIG. 2 is a block diagram of the battery 40, the BMS 50, and the power supply circuit 60 that are coupled to each other, according to an embodiment of the present invention. FIG. 3 is a block diagram of one or more battery racks 41-1 . . . 41-n according to an embodiment of the present invention.

Figure 3:
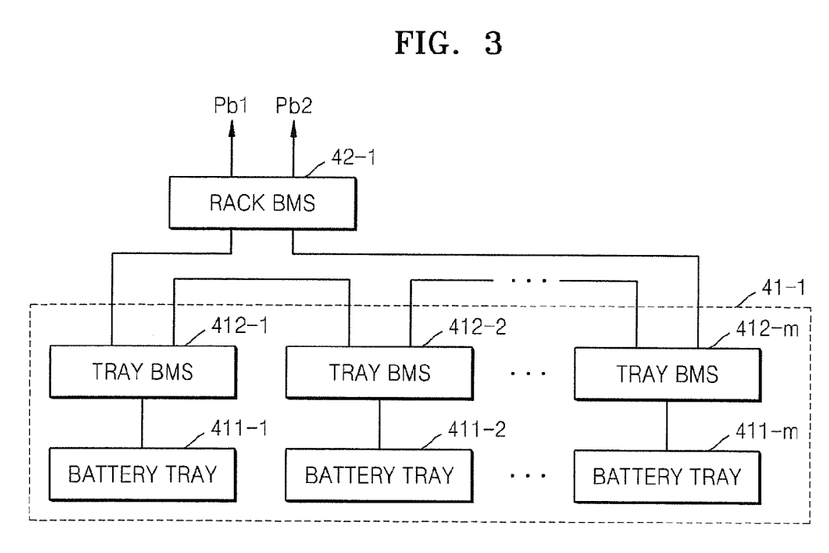
FIG. 3 is a block diagram of one or more battery racks according to an embodiment of the present invention.

Referring to FIGS. 2 and 3, the battery 40 may include the one or more battery racks 41-1 . . . 41-n and one or more rack BMSs 42-1 . . . 42-n that respectively control the battery racks 41-1 . . . 41-n. The battery racks 41-1 . . . 41-n may include a plurality of battery trays 411-1 . . . 411-m and a plurality of tray BMSs 412-1 . . . 412-m that respectively control the battery trays 411-1 . . . 411-m.

Each of the battery trays 411-1 . . . 411-m may include one or more battery cells. The battery cells may include a nickel-cadmium battery, a lead acid battery, a nickel metal hydride (NiMH) battery, a lithium ion battery, a lithium polymer battery, or the like. The battery cells included in the battery trays 411-1 . . . 411-m may be coupled to each other in series, in parallel, or in combination thereof. Furthermore, the one or more battery trays 411-1 . . . 411-m may be coupled to each other in series. However, the present embodiment is not limited thereto, and the one or more battery trays 411-1 . . . 411-m may be coupled to each other in parallel or in combination of parallel and series.

The tray BMSs 412-1, . . . 412-m monitor voltages, currents, temperatures, remaining capacities of the battery cells included in the battery trays 411-1 . . . 411-m, and control charging and discharging of the battery trays 411-1 . . . 411-m according to a monitoring result. Furthermore, the tray BMSs 412-1 . . . 412-m may perform overcharge protection, over-discharge protection, over-current protection, overvoltage protection, overheat protection, and/or cell balancing according to a result of the monitoring in order to protect the battery trays 411-1 . . . 411-m. The tray BMSs 412-1 . . . 412-m may transmit the monitoring result to the rack BMSs 42-1 . . . 42-n, receive a control signal from the rack BMSs 42-1 . . . 42-n, and control the battery trays 411-1 . . . 411-m.

The rack BMSs 42-1 . . . 42-n monitor voltages, currents, temperatures, remaining capacities of the battery racks 41-1 . . . 41-n, and control charging and discharging of the battery racks 41-1 . . . 41-n according to a result of the monitoring. Furthermore, the rack BMSs 42-1 . . . 42-n may perform overcharge protection, over-discharge protection, over-current protection, overvoltage protection, overheat protection, and/or cell balancing according to the result of the monitoring in order to protect the battery racks 41-1 . . . 41-n. The rack BMSs 42-1 . . . 42-n may transmit the monitoring result to the BMS 50, receive a control signal from the BMS 50, and control the battery racks 41-1 . . . 41-n.

The one or more battery racks 41-1 . . . 41-n may be coupled to each other in parallel. However, the present embodiment is not limited thereto, and the one or more battery racks 41-1 . . . 41-n may be coupled to each other in series or in combination of parallel and series.

Here, the one or more battery racks 41-1 . . . 41-n output power Pb1 that is to be supplied to the load 4 or the grid 3 according to the rack BMSs 42-1 . . . 42-n. Furthermore, the one or more battery racks 41-1 . . . 41-n output power Pb2 used to operate the BMS 50 to the power supply circuit 60 when external power is not supplied to the BMS 50 as an operating power. Referring to FIG. 2, the power supply circuit 60 supplies external power Po or the power Pb2 output from the battery 40 to the BMS 50 as the operating power.

Here, although the power output from the battery 40 is output to the outside through the tray BMSs 412-1 . . . 412-m, the rack BMSs 42-1 . . . 42-n, and the BMS 50 in FIGS. 1 through 3, the present embodiment is not limited thereto. The battery 40 for the power storage system 1 has a very large capacity, output voltage, output current, etc., and thus a power supply path may be isolated from each BMS.

The number of the battery racks 41-1 . . . 41-n included in the battery 40 may be determined based on power capacity, design conditions, etc. required by the power storage system 1. For example, if the load 4 has large power consumption, the battery 40 may include the battery racks 41-1 . . . 41-n, and, when the load 4 has small power consumption, the battery 40 may include only the battery rack 41-1.

The BMS 50 is coupled to the battery 40, and controls charging and discharging of the battery 40. The BMS 50 may perform overcharge protection, over-discharge protection, over-current protection, overvoltage protection, overheat protection, and cell balancing in order to protect the battery 40. To this end, the BMS 50 may monitor a voltage, a current, a temperature, a remaining amount of power, a lifetime, and a state of charge of the battery 40 or receive a result of the monitoring from the rack BMSs 42-1 . . . 42-n and the tray BMSs 412-1 . . . 412-m, and transmit the result of the monitoring to the integrated controller 90. The BMS 50 may receive a control signal from the integrated controller 90 to control the battery 40.

The power supply circuit 60 supplies power necessary for the operation of the BMS 50. The power supply circuit 60 may selectively supply external power or the power output from the battery 40 to the BMS 50. The power supply circuit 60 supplies the external power to the BMS 50 when the BMS 50 is powered by the external power. However, when the external power is not supplied due to a power failure, or the like, the power supply circuit 60 supplies the power output from the battery 40 to the BMS 50 as the operating power.

Referring to FIG. 1, the bidirectional converter 70 performs DC-DC conversion by converting a voltage of power output from the battery 40 into the DC link voltage that is suitable for the bidirectional inverter 30 in a discharge mode. The bidirectional converter 70 performs DC-DC conversion by converting charge power introduced through the first node N1 into a charge voltage suitable for the battery 40 in a charge mode. Here, the term "charge power" may refer to, for example, power generated by the power generation system 2 or power supplied from the grid 3 through the bidirectional inverter 30. The bidirectional converter 70 may stop an operation thereof and minimize or reduce power consumption thereof when there is no need to charge or discharge the battery 40.

The first switch 80 and the second switch 81 are coupled in series, and the first switch 80 is between the bidirectional inverter 30 and a second node N2. The first switch 80 and the second switch 81 control the flow of current between the power generation system 2 and the grid 3 by being turned on or off under the control of the integrated controller 90. The first switch 80 and the second switch 81 may be turned on or off according to various states of the power generation system 2, the grid 3, and the battery 40. For example, when power required by the load 4 is high, both the first switch 80 and the second switch 81 may be turned on to use all available power from the power generation system 2 and the grid 3. If power required by the load 4 is greater than available power supplied from the power generation system 2 and the grid 3, power stored in the battery 40 may also be supplied to the load 4. If there is a power failure in the grid 3, the second switch 81 is turned off and the first switch 80 is turned on. Accordingly, power from the power generation system 2 or the battery 40 may be supplied to the load 4, but does not flow into the grid 3, thereby preventing a worker who works at a power distribution line of the grid 3 or the like from getting an electric shock.

The integrated controller 90 monitors the states of the power generation system 2, the grid 3, the battery 40, and the load 4, and controls the power converting unit 10, the bidirectional inverter 30, the BMS 50, the bidirectional converter 70, the first switch 80, and the second switch 81 according to results of the monitoring. The integrated controller 90 monitors whether the grid 3 is coupled to the load 4, whether the power generation system 2 generates power, and the like. Furthermore, the integrated controller 90 may monitor an amount of power generated by the power generation system 2, a charge state of the battery 40, an amount of power consumed by the load 4, time, and the like.

Hereinafter, the construction and the operation of the power supply circuit 60 will be described in more detail.

First Embodiment

Figure 4:
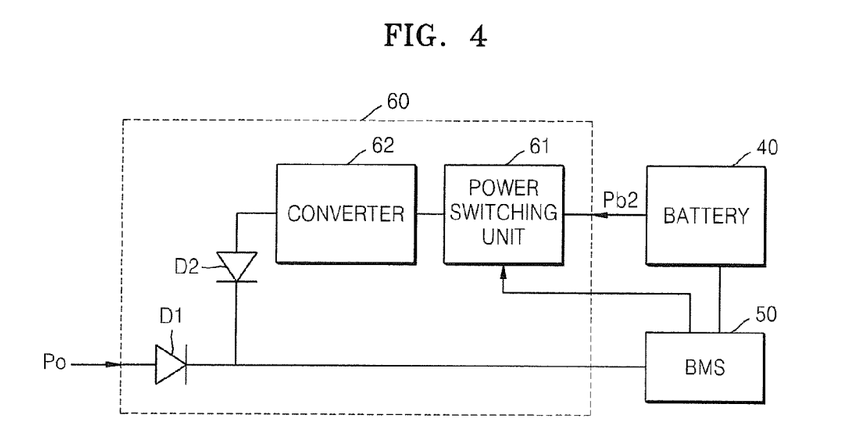
FIG. 4 is a circuit diagram illustrating a power supply circuit according to an embodiment of the present invention.

FIG. 4 is a circuit diagram illustrating the power supply circuit 60 according to an embodiment of the present invention.

Referring to FIG. 4, the power supply circuit 60 may include a first diode D1, a second diode D2, a power switching unit 61, and a converter 62.

The power supply circuit 60 receives the external power Po as an operating power of the BMS 50 and supplies the external power Po to the BMS 50. The power supply circuit 60 includes a path for supplying the external power Po to the BMS 50, and includes the first diode D1 coupled between an input terminal to which the external power Po is applied and the BMS 50 on the path for supplying the external power Po so as to prevent a backflow of current.

Also, the power supply circuit 60 receives the power Pb2 output from the battery 40 as the operating power of the BMS 50 and supplies the power Pb2 to the BMS 50. The power supply circuit 60 includes a path for supplying the power Pb2 to the BMS 50, and includes the second diode D2, the power switching unit 61, and the converter 62 on the path for supplying the power Pb2.

The power switching unit 61 controls a supply of the power of the battery 40 to the converter 62. If an external power is not applied to the power supply circuit 60, the power switching unit 61 is turned on and supplies the power of the battery 40 to the converter 62. An operation of turning on/off the power switching unit 61 may be controlled by a control signal of the BMS 50. For example, if a P-channel field effect transistor (FET) is used as the power switching unit 61, in a normal state when the external power is supplied to the BMS 50, the BMS 50 applies a high level control signal to a gate electrode of the P-channel FET to prevent the power of the battery 40 from being transmitted to the converter 62. However, in an abnormal state when the external power is not supplied to the BMS 50, the BMS 50 applies a low level control signal to the gate electrode of the P channel FET to supply the power of the battery 40 to the converter 62.

The converter 62 converts a voltage of the power of the battery 40 supplied through the power switching unit 61 into a previously set voltage. The previously set voltage may have the same magnitude as a voltage of the external power Po. For example, if the voltage of the external power Po supplied from the outside is 24V, and an output voltage of the battery 40 is 50V, a voltage drop type DC-DC converter may be used as the converter 62 to convert 50V into 24V that is supplied to the BMS 50. However, the present embodiment is not limited thereto, and the converter 62 may operate as a drop (or step down) voltage converter or a boost (step up) voltage converter according to the voltage of the external power Po and the output voltage of the battery 40.

The second diode D2 is coupled between the converter 62 and the BMS 50 and prevents a backflow of current on the path for supplying the power Pb2 output from the battery 40. The second diode D2 may supply power to the BMS 50 through the same terminal as a terminal for supplying the external power Po to the BMS 50. That is, cathode electrodes of the first diode D1 and the second diode D2 may be coupled to each other.

In FIG. 4, when the external power Po is not supplied, the power supply circuit 60 supplies the power Pb2 output from the battery 40 to the BMS 50, thereby stably operating the BMS 50.

Second Embodiment

Figure 5:
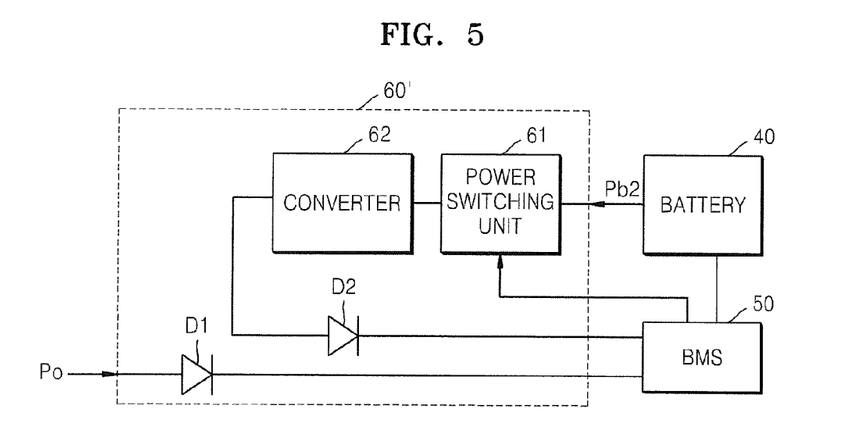
FIG. 5 is a circuit diagram illustrating a power supply circuit according to another embodiment of the present invention.

FIG. 5 is a circuit diagram illustrating a power supply circuit 60' according to another embodiment of the present invention. For example, the power supply circuit 60' may be used to replace the power supply circuit 60 of FIG. 1.

Referring to FIG. 5, the power supply circuit 60' may include the first diode D1, the second diode D2, the power switching unit 61, and the converter 62. The operations of the elements of the power supply circuit 60' are substantially the same as corresponding components described with reference to FIG. 4, and thus differences therebetween will now be described.

The converter 62 of the present embodiment converts a voltage of the power of the battery 40 supplied through the power switching unit 61 into a voltage for operating the parts included in the BMS 50. The BMS 50 may include a regulator to convert a voltage applied from the outside into the voltage for operating the parts included therein. For example, the BMS 50 receives external power having a voltage of 24V and converts the voltage into 5V by using the regulator. Thus, in the present embodiment, if an output voltage of the battery 40 is 50V, and the parts included in the BMS 50 operate at 5V, a voltage drop type DC-DC converter may be used as the converter 62 to convert 50V into 5V and supply the power to the BMS 50. However, the present embodiment is not limited thereto, and the converter 62 may convert the voltage of the power according to types of the parts included in the BMS 50.

In the present embodiment, the voltages of the external power Po and the power Pb2 of the battery 40 are different from each other, and thus each of the external power Po and the power Pb2 may be applied to different terminals of the BMS 50. Therefore, the second diode D2 may be coupled to a terminal that is different from a terminal of the BMS 50 to which the external power Po is applied and supplies the power Pb2 of the battery 40 to the BMS 50.

In FIG. 5, when the external power Po is not supplied, the power supply circuit 60 supplies the power Pb2 output from the battery 40 to the BMS 50, thereby stably operating the BMS 50. The power supply circuit 60 converts the output voltage of the battery 40 into the voltage for operating the parts included in the BMS 50, thereby reducing the number of voltage conversions.

Figure 6:
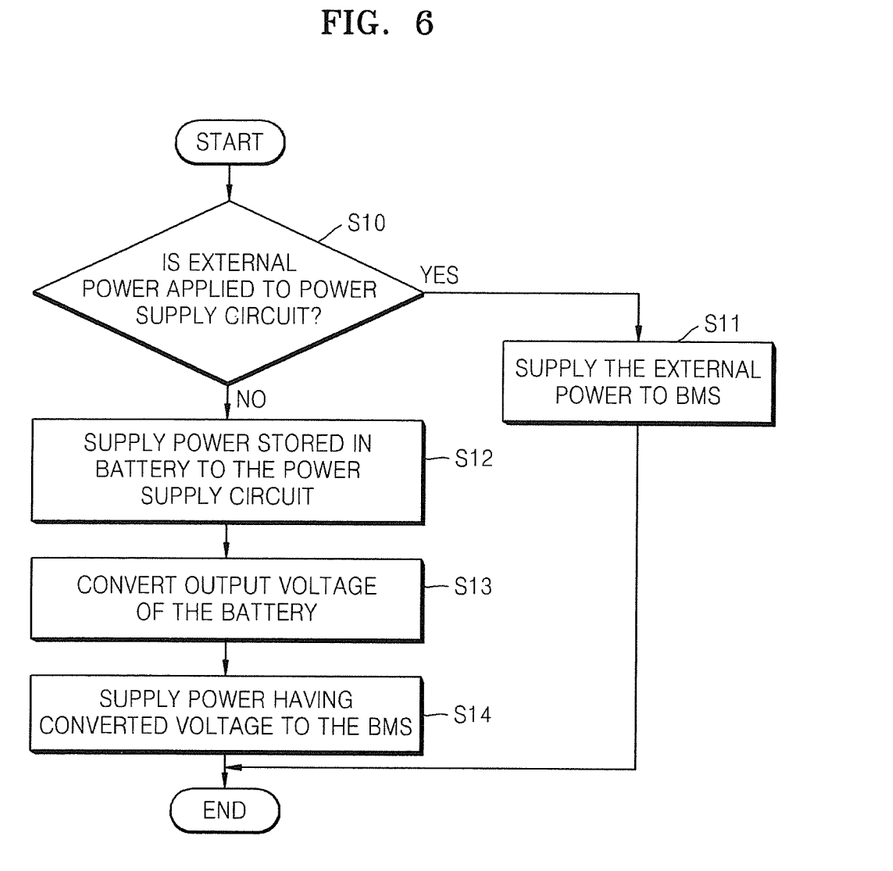
FIG. 6 is a flowchart illustrating a method of controlling a power supply circuit according to an embodiment of the present invention.

FIG. 6 is a flowchart illustrating a method of controlling the power supply circuit 60, according to an embodiment of the present invention.

Referring to FIG. 6, the BMS 50 determines whether the external power Po is applied to the power supply circuit 60 or 60' (operation S10). If the BMS 50 determines that the external power Po is applied to the power supply circuit 60 or 60', since it is a normal state, the BMS 50 applies the external power Po to the BMS 50 (operation S11).

If the BMS 50 determines that the external power Po is not applied to the power supply circuit 60 or 60', the power switching unit 61 supplies power stored in the battery 40 to the converter 62 according to the control of the BMS 50 (operation S12). The converter 62 converts a voltage of the power Pb2 output from the battery 40 into a voltage with a previously set value (operation S13). The previously set value may be a voltage value of the external power PO or a voltage value for operating the parts included in the BMS 50.

The power having the converted voltage is supplied to the BMS 50 (operation S14), thus stably supplying an operating power to the BMS 50 even in an abnormal state when the external power Po is not supplied.

Third Embodiment

Figure 7:
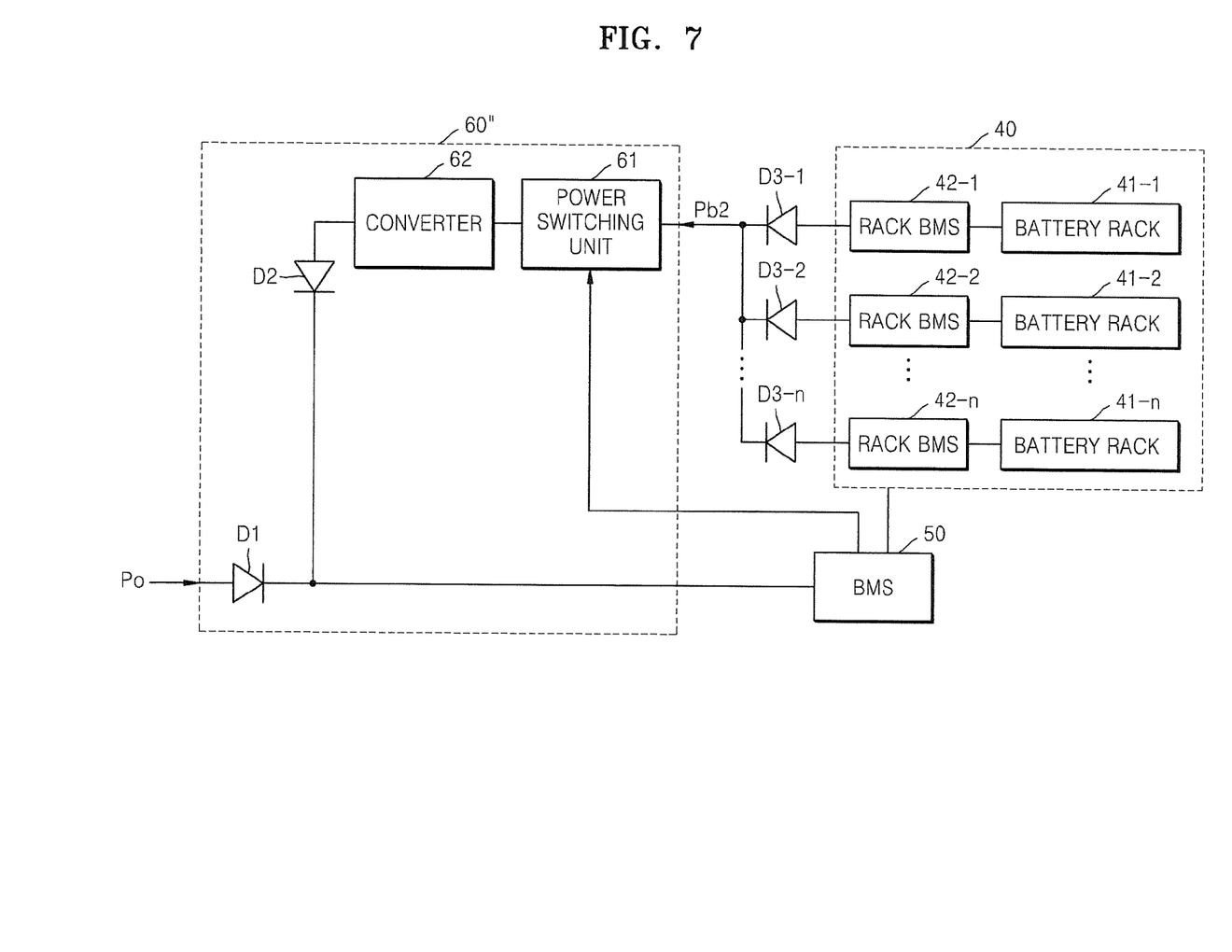
FIG. 7 is a circuit diagram illustrating a power supply circuit according to another embodiment of the present invention.

FIG. 7 is a circuit diagram illustrating the power supply circuit 60'' according to another embodiment of the present invention. For example, the power supply circuit 60'' may be used to replace the power supply circuit 60 of FIG. 1.

Referring to FIG. 7, the power supply circuit 60'' may include the first diode D1, the second diode D2, the power switching unit 61, and the converter 62. The power supply circuit 60 may further include a plurality of diodes D3-1 ... D3-$n$ for receiving power from one or more power outputs from the battery 40. The operations of the elements of the power supply circuit 60'' are substantially the same as corresponding components described with reference to FIG. 4, and thus differences therebetween will now be described.

In the present embodiment, the battery 40 includes the plurality of battery racks 41-1 ... 41-$n$ and the plurality of rack BMSs 42-1 ... 42-$n$. The power supply circuit 60 receives power from one or more of the battery racks 41-1 ... 41-$n$ having the maximum remaining capacity.

To this end, the battery racks 41-1 ... 41-$n$ may include the diodes D3-1 ... D3-$n$ between output terminals and the power switching unit 61. The greater the remaining capacity of the battery racks 41-1 ... 41-$n$, the higher output voltages are produced. Thus, when the power switching unit 61 is turned on according to the control of the BMS 50, the power is output from one or more of the battery racks 41-1 ... 41-$n$ having the maximum remaining capacity and is applied to the power switching unit 61. However, the present invention is not limited thereto. For example, the BMS 50 can communicate various types of data with the rack BMSs 42-1 ... 42-$n$, and thus the BMS 50 determines the remaining capacity of the battery racks 41-1 ... 41-$n$ in real time, and selects one of the battery racks 41-1 ... 41-$n$ from which an operating power of the BMS 50 is received in real time. And, in an abnormal state when the external power is not supplied, the BMS 50 controls the rack BMS of the selected battery rack to supply the power to the BMS 50.

Alternatively, the power supply circuit 60'' may be previously set to receive the power from a specific battery rack from among the battery racks 41-1 ... 41-$n$. In this case, the power supply circuit 60'' is coupled to the previously set battery rack and may receive the power therefrom in an abnormal state.

When the external power Po is not supplied, the power supply circuit 60'' of the present embodiment supplies the power Pb2 output from the battery 40 to the BMS 50, thereby stably operating the BMS 50. The power supply circuit 60'' receives power from one of the battery racks 41-1 ... 41-$n$ having the maximum remaining capacity, thereby performing a cell balancing function, which increases the lifespan of the battery racks 41-1 ... 41-$n$. Alternatively, the power supply circuit 60'' receives the power from a previously set specific battery rack from among the battery racks 41-1 ... 41-$n$, thereby realizing a relatively simple construction of the power supply circuit 60''.

Fourth Embodiment

Figure 8:
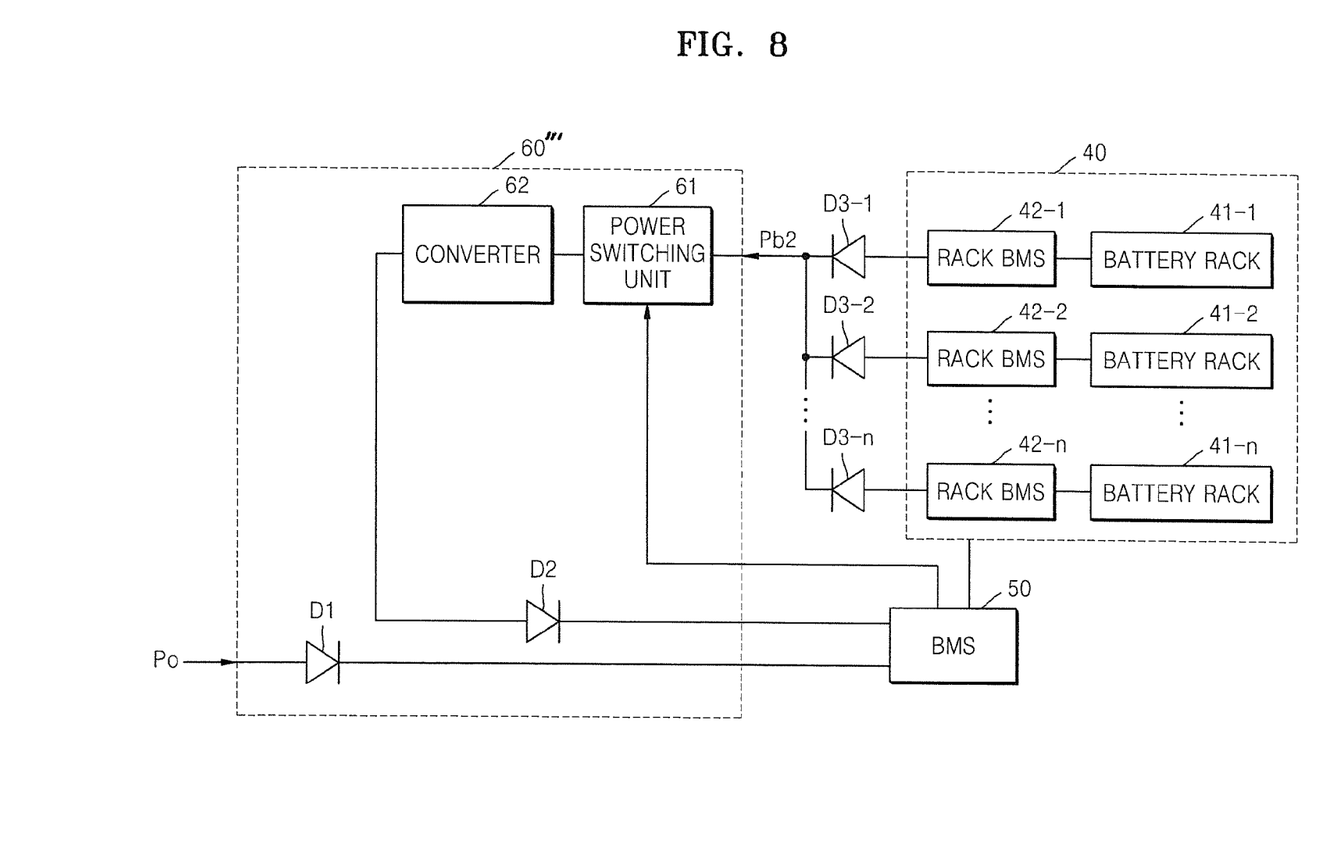
FIG. 8 is a circuit diagram illustrating a power supply circuit according to another embodiment of the present invention.

FIG. 8 is a circuit diagram illustrating a power supply circuit 60''' according to another embodiment of the present invention. For example, the power supply circuit 60''' may be used to replace the power supply circuit 60 of FIG. 1.

Referring to FIG. 8, the power supply circuit 60''' may include the first diode D1, the second diode D2, the power switching unit 61, and the converter 62. The power supply circuit 60''' may further include the diodes D3-1 ... D3-$n$ for receiving power from one or more power outputs from the battery 40. The operations of the elements of the power supply circuit 60' are substantially the same as corresponding components described with reference to FIGS. 5 and 7, and thus the detailed descriptions thereof will not be repeated here.

Figure 9:
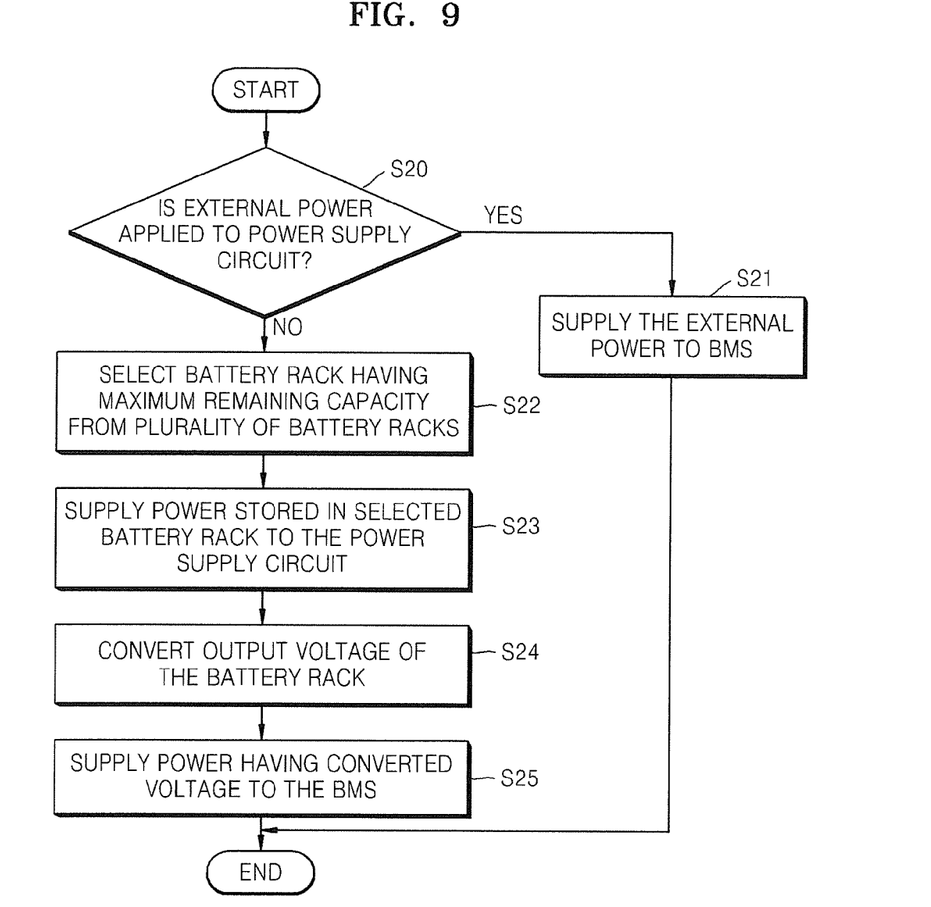
FIG. 9 is a flowchart illustrating a method of controlling a power supply circuit according to another embodiment of the present invention.

FIG. 9 is a flowchart illustrating a method of controlling the power supply circuit 60'' or 60''', according to another embodiment of the present invention.

Referring to FIG. 9, the BMS 50 determines whether the external power Po is applied to the power supply circuit 60'' or 60''' (operation S20). If the BMS 50 determines that the external power Po is applied to the power supply circuit 60'' or 60''', since it is a normal state, the BMS 50 applies the external power Po to the BMS 50 (operation S21).

If the BMS 50 determines that the external power Po is not applied to the power supply circuit 60'' or 60''', one of the battery racks 41-1 ... 41-$n$ having the maximum remaining capacity is selected (operation S22). One of the battery racks 41-1 ... 41-$n$ having the maximum remaining capacity is selected automatically, or the BMS 50 selects a specific battery rack among the battery racks 41-1 ... 41-$n$ as described with reference to FIG. 7. The power switching unit 61 supplies power stored in the selected battery rack to the converter 62 according to the control of the BMS 50 (operation S23). The converter 62 converts a voltage of the power Pb2 output from the battery 40 into a voltage with a previously set value (operation S24). The previously set value may be a voltage value of the external power PO or a voltage value for operating the parts included in the BMS 50.

The power having the converted voltage is supplied to the BMS 50 (operation S25), thus stably supplying an operating power to the BMS 50 even in an abnormal state when the external power Po is not supplied.

A program for executing the methods according to the embodiments of the present invention in the power storage systems according to the embodiments of the present invention may be stored in a recording medium. The recording medium is a medium that may be read by a processor or a computing device. The recording medium may be a semiconductor recording medium (e.g., a flash memory, a static random access memory (SRAM), or the like). For example, the recording medium may be embedded in the BMS 50 or the integrated controller 90, and the program may be executed by a processor, for example, the integrated controller 90.

While the embodiments of the present invention have been particularly shown and described, the embodiments should be considered in a descriptive sense only and not for purposes of limitation. Accordingly, it will be understood by those of ordinary skill in the art that various changes in form and details may be made therein without departing from the spirit and scope of the embodiments of the present invention as defined by the following claims, and equivalents thereto.

What is claimed is:

1. A power storage system for supplying power to a load by coupling a power generation system, a battery, and a grid, the power storage system comprising:
    an integrated controller for monitoring states of the power generation system;
    a battery management system (BMS) for controlling charging and discharging of the battery according to a control signal from the integrated controller; and
    a power supply circuit for supplying power to the BMS, and comprising:
        a converter configured to adjust a power of the battery by reducing a voltage of the power of the battery and to supply the adjusted power of the battery to the BMS;
        a first diode coupled between an input terminal for receiving an external power and a power supply terminal of the BMS; and
        a second diode coupled between the converter and the power supply terminal of the BMS,
    wherein the power supply circuit is configured to supply the external power to the BMS as an operating power of the BMS in a first state in which the external power is applied, and
    wherein the power supply circuit is configured to supply the adjusted power of the battery to the BMS as the operating power of the BMS in a second state in which the external power is not applied.

2. The power storage system of claim 1, wherein the power supply circuit comprises:
    a first power supply path for applying the external power to the BMS; and
    a second power supply path for applying the power of the battery to the BMS.

3. The power storage system of claim 1, wherein the converter is configured to reduce the voltage of the power of the battery to be a same magnitude as a voltage of the external power.

4. The power storage system of claim 1, wherein the converter is configured to reduce the voltage of the power of the battery to an operating voltage of the BMS.

5. The power storage system of claim 1, wherein the power supply circuit further comprises a power switching unit for controlling a supply of the power of the battery to the converter according to the control of the BMS.

6. The power storage system of claim 5, wherein the BMS is configured to turn the power switching unit on in the second state.

7. The power storage system of claim 1, wherein the battery comprises a plurality of battery racks.

8. The power storage system of claim 7, wherein the power supply circuit is configured to receive power from a battery rack having a maximum remaining capacity from among the plurality of battery racks in the second state.

9. The power storage system of claim 7, further comprising a plurality of diodes each coupled between a corresponding one of the plurality of battery racks and the power supply circuit.

10. The power storage system of claim 7, wherein the power supply circuit is configured to receive power from a previously set battery rack from among the plurality of battery racks in the second state.

11. A method of controlling a power storage system for supplying power to a load by coupling power of a power generation system, a battery, and a grid, the power storage system comprising an integrated controller for monitoring states of the power generation system, a BMS for controlling charging and discharging of the battery according to a control signal from the integrated controller, and a power supply circuit for supplying power to the BMS, the method comprising:
    (a) supplying an external power to the BMS as an operating power of the BMS in a first state in which the external power is applied,
    (b) supplying the power of the battery to the power supply circuit in a second state in which the external power is not applied, wherein the power supply circuit comprises a converter configured to adjust a power of the battery by reducing a voltage of a power of the battery to an operating voltage of the BMS and to supply the adjusted power of the battery to the BMS, and
    (c) supplying the adjusted power of the battery to the BMS as the operating power of the BMS in the second state.

12. The method of claim 11, wherein, the voltage of the power of the battery is reduced to be a same magnitude as a voltage of the external power.

13. The method of claim 11, wherein the battery comprises a plurality of battery racks,
    the method further comprising: (d) receiving power from a battery rack having a maximum remaining capacity from among the plurality of battery racks in the second state.

14. The method of claim 11, wherein the battery comprises a plurality of battery racks,
    the method further comprising: (e) receiving power from a previously set battery rack among the plurality of battery racks in the second state.

* * * * *